US010835993B2

(12) United States Patent
Matsuoka et al.

(10) Patent No.: US 10,835,993 B2
(45) Date of Patent: Nov. 17, 2020

(54) LASER WELDING METHOD

(71) Applicant: Panasonic Intellectual Property Management Co., Ltd., Osaka (JP)

(72) Inventors: Noriyuki Matsuoka, Osaka (JP); Atsuhiro Kawamoto, Hyogo (JP); Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 318 days.

(21) Appl. No.: 15/745,726

(22) PCT Filed: Aug. 2, 2016

(86) PCT No.: PCT/JP2016/003549
§ 371 (c)(1),
(2) Date: Jan. 18, 2018

(87) PCT Pub. No.: WO2017/022238
PCT Pub. Date: Feb. 9, 2017

(65) Prior Publication Data
US 2018/0221989 A1  Aug. 9, 2018

(30) Foreign Application Priority Data
Aug. 5, 2015  (JP) .................... 2015-154931

(51) Int. Cl.
*B23K 26/082*  (2014.01)
*B23K 26/21*  (2014.01)
(Continued)

(52) U.S. Cl.
CPC ............ *B23K 26/082* (2015.10); *B23K 26/02* (2013.01); *B23K 26/0626* (2013.01);
(Continued)

(58) Field of Classification Search
CPC .. B23K 26/082; B23K 26/0821; B23K 26/08; B23K 26/103; B63K 26/244;
(Continued)

(56) References Cited

U.S. PATENT DOCUMENTS 4,263,496 A * 4/1981 Medlar .............. B23K 15/0053
219/121.14
5,595,670 A * 1/1997 Mombo-Caristan ........................
B23K 15/006
219/121.64
(Continued)

FOREIGN PATENT DOCUMENTS

JP  2006-159234  6/2006
JP  2008-126241  6/2008
(Continued)

OTHER PUBLICATIONS

International Search Report of PCT application No. PCT/JP2016/003549 dated Oct. 4, 2016.

*Primary Examiner* — Lien M Ngo
(74) *Attorney, Agent, or Firm* — Wenderoth, Lind & Ponack, L.L.P.

(57) ABSTRACT

The laser welding method according to the present disclosure has a first step for forming a weld bead by irradiating an object to be welded with a laser beam along a first helical trajectory around a first center of rotation moving in a welding direction, and a second step for irradiating the object to be welded with a laser beam along a second helical trajectory around a second center of rotation moving in the welding direction. A diameter of rotation of the laser beam in the first step is larger than a diameter of rotation of the laser beam in the second step.

5 Claims, 9 Drawing Sheets

(51) Int. Cl.
    *B23K 26/244* (2014.01)
    *B23K 26/06* (2014.01)
    *B23K 26/02* (2014.01)
    *B23K 26/08* (2014.01)
    *B23K 26/32* (2014.01)

(52) U.S. Cl.
    CPC .......... *B23K 26/0876* (2013.01); *B23K 26/21* (2015.10); *B23K 26/244* (2015.10); *B23K 26/32* (2013.01)

(58) Field of Classification Search
    CPC ................ B63K 26/0626; B63K 26/02; B63K 26/0876; B63K 26/32; B63K 26/21
    USPC ............ 219/121.63, 121.64, 121.13, 121.14, 219/121.45, 121.46
    See application file for complete search history.

(56) References Cited

U.S. PATENT DOCUMENTS

| | | | |
|---|---|---|---|
| 5,603,853 A * | 2/1997 | Mombo-Caristan | B23K 15/006 219/121.64 |
| 10,155,285 B2 * | 12/2018 | Fujiwara | B23K 26/322 |
| 10,286,491 B2 * | 5/2019 | Nakagawa | B23K 26/0876 |
| 10,328,513 B2 * | 6/2019 | Lin | B23K 9/0052 |
| 2010/0206856 A1 * | 8/2010 | Tanaka | B23K 26/03 219/121.64 |
| 2013/0119025 A1 * | 5/2013 | Lee | B23K 26/0884 219/121.64 |
| 2014/0048518 A1 * | 2/2014 | Ogura | B23K 26/22 219/121.64 |
| 2015/0145241 A1 * | 5/2015 | Asami | B23K 26/70 285/288.1 |
| 2015/0283648 A1 | 10/2015 | Hisada et al. | |
| 2015/0336212 A1 | 11/2015 | Hisada et al. | |
| 2016/0354867 A1 * | 12/2016 | Matsuoka | B23K 26/0626 |

FOREIGN PATENT DOCUMENTS

| | | |
|---|---|---|
| JP | 2010-046674 | 3/2010 |
| JP | 2011-173146 | 9/2011 |
| JP | 5224349 B | 7/2013 |
| JP | 2014-147962 | 8/2014 |
| JP | 2015-030018 | 2/2015 |
| JP | 2015-074012 | 4/2015 |
| JP | 2015-199097 | 11/2015 |
| JP | 2015-221446 | 12/2015 |

* cited by examiner

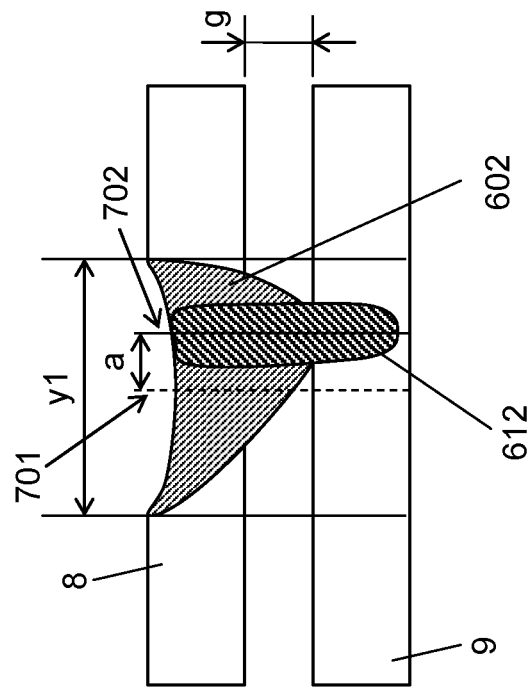
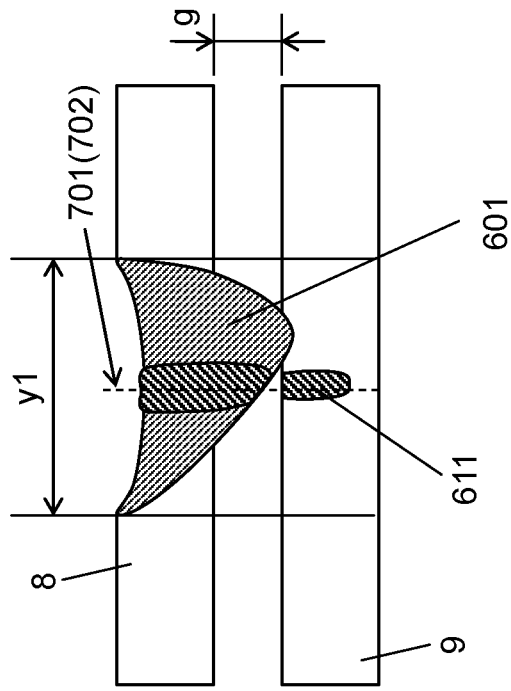

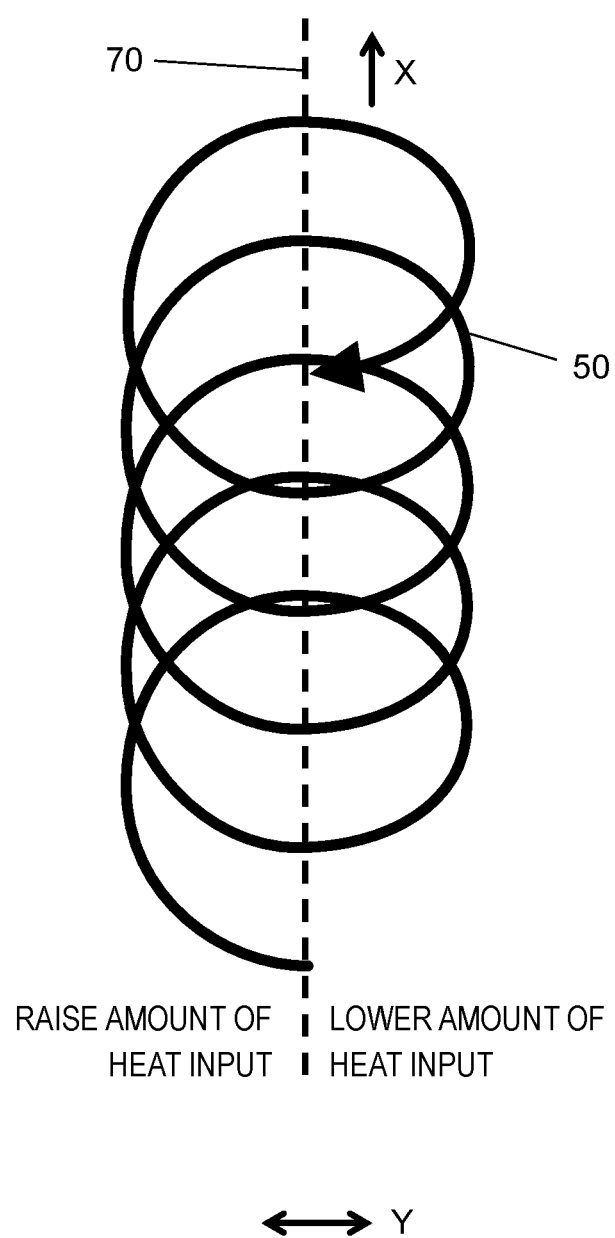

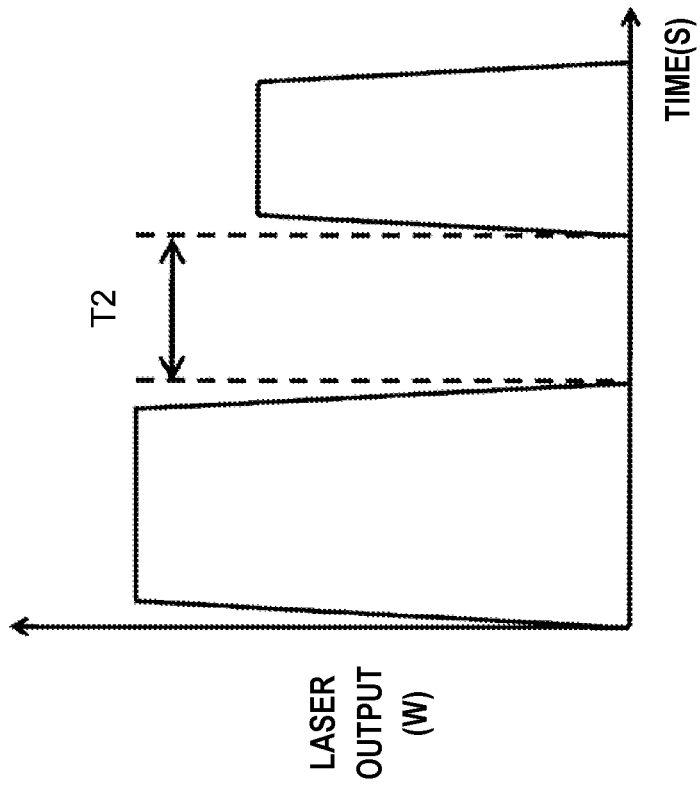
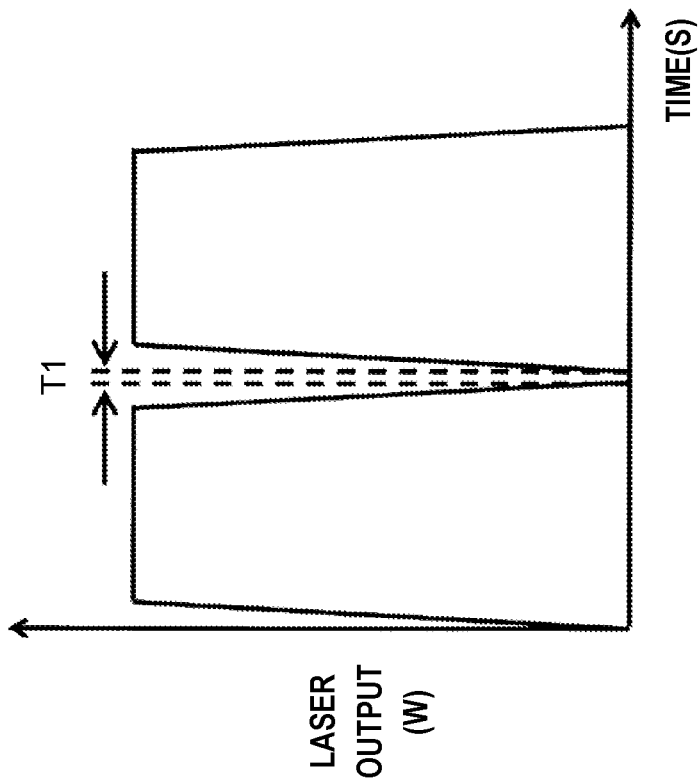

LASER WELDING METHOD

This application is a U.S. national stage application of the PCT International Application No. PCT/JP2016/003549 filed on Aug. 2, 2016, which claims the benefit of foreign priority of Japanese patent application No. 2015-154931 filed on Aug. 5, 2015, the contents all of which are incorporated herein by reference.

TECHNICAL FIELD

The present disclosure relates to a laser welding method in which, when there is a gap between objects to be welded, at least two welding steps are performed which are a welding step for filling the gap and a welding step for ensuring a penetration depth.

BACKGROUND ART

In laser welding, burn through is likely to occur when there is gap g between objects to be welded. This is because, due to an energy density being high and a weld bead being narrow, an amount of molten metal for filling gap g is insufficient. An example where burn through occurs will be described with reference to FIG. 8. As illustrated in FIG. 8, there is a gap between upper plate 8 and lower plate 9. FIG. 8 is a schematic view illustrating a cross section when upper plate 8 and lower plate 9 are irradiated with linear laser beam 7 to be laser welded. In a state after the welding illustrated in FIG. 8, an amount of molten metal is insufficient due to a weld bead being narrow, resulting in that gap g between upper plate 8 and lower plate 9 cannot be filled. That is, FIG. 8 shows a state where burn through occurs. In view of this, various methods have been proposed for suppressing burn through in laser welding in a case where there is a gap.

For example, PTL 1 proposes that lap welding is performed, while a filler wire is continuously fed according to the size of gap g between base materials at a site to be welded. PTL 1 also indicates that the fed amount of the filler wire is controlled to be variable according to the size of gap g between the base materials at the site to be welded.

In PTL 2, parts of two thin plates overlapped with gap g therebetween are welded by performing laser irradiation twice. The first laser irradiation is performed in a defocused state where the laser beam is not focused. On the portion having gap g, the upper plate on the laser irradiation side is melted and recessed toward the lower plate to decrease gap g. On the portion with no gap g, the upper plate and the lower plate are bonded such that the laser beam does not reach the back side of the lower plate, and by the second laser welding, the laser beam penetrates the lower plate to reach the back side thereof, and thus, the upper plate and the lower plate are welded.

CITATION LIST

Patent Literature

PTL 1: Unexamined Japanese Patent Publication No. 2006-159234
PTL 2: Japanese Patent No. 5224349

SUMMARY OF THE INVENTION

A laser welding method according to the present disclosure has a first step for forming a weld bead by irradiating an object to be welded with a laser beam along a first helical trajectory around a first center of rotation moving in a welding direction, and a second step for irradiating the object to be welded with a laser beam along a second helical trajectory around a second center of rotation moving in the welding direction, wherein a diameter of rotation of the laser beam in the first step is larger than a diameter of rotation of the laser beam in the second step.

Another laser welding method according to the present disclosure has a first step for forming a weld bead by irradiating an object to be welded with a laser beam along a first helical trajectory around a first center of rotation moving in a welding direction, and a second step for irradiating the weld bead formed by the first step on the object to be welded with a laser beam along the welding direction.

BRIEF DESCRIPTION OF DRAWINGS

FIG. 4A is a view illustrating a cross section of an object to be welded in a second exemplary embodiment.

FIG. 4B is a view illustrating the cross section of the object to be welded in the second exemplary embodiment.

FIG. 6 is a diagram illustrating an irradiation position of a laser beam according to a fourth exemplary embodiment.

FIG. 7A is a diagram illustrating a relationship between a laser output and a time in fifth and sixth exemplary embodiments.

FIG. 7B is a diagram illustrating a relationship between a laser output and a time in fifth and sixth exemplary embodiments.

DESCRIPTION OF EMBODIMENTS

Prior to describing exemplary embodiments of the present disclosure, problems of a conventional device will be briefly described.

The welding method disclosed in PTL 1 needs a wire feed device for feeding a filler. Therefore, there arises a problem of interference between the wire feed device and a workpiece, and thus, a degree of freedom in design is deteriorated.

In the welding method disclosed in PTL 2, welding using a defocused laser beam is performed as the first welding step. However, the welding using the defocused laser beam is heat conduction welding, and thus, a bead width and a penetration depth greatly differ depending on materials of workpieces. For example, heat conductivity of a material is slightly different depending on the difference between soft steel and high tensile steel, and even in same soft steel, the heat conductivity is slightly different depending on the difference in added elements or difference in design of the material. Accordingly, for a material having a high heat conductivity, a bead width becomes larger, and a penetration depth becomes lower, because of heat being diffused, whereas in a material having a low heat conductivity, heat is likely to be trapped, so that a bead width becomes smaller and a penetration depth becomes higher. Compared to keyhole welding, a difference in physical properties of materials is significant in heat conduction welding.

The welding using a defocused laser beam is also largely affected by a thermal lens effect (a phenomenon in which properties such as a refractive index vary due to heating of an optical system) of an optical system. The thermal lens effect also occurs in keyhole welding on a focused position. However, due to a beam diameter being small, the influence of the thermal lens effect is small. In welding using a defocused laser beam, a beam diameter is large, and therefore, the influence of the thermal lens effect becomes larger.

Supposing that the beam diameter of a laser beam on the focused position in keyhole welding is 700 µm, for example. If the beam diameter is 1.2 times larger by the thermal lens effect, the beam diameter becomes 840 µm. On the other hand, if a beam diameter of a defocused laser beam is 1500 µm, and this beam diameter is similarly 1.2 times larger by the thermal lens effect, the beam diameter becomes 1800 µm. That is, the variation of the beam diameter is 300 µm which is larger than the variation in the keyhole welding on the focused position, and this shows that the welding using a defocused laser beam is more susceptible to the thermal lens effect.

As described above, the welding method disclosed in PTL 2 is highly susceptible to influences of external factors such as a difference in workpiece materials or a thermal lens effect, and thus, cannot provide stable welding results with high reproducibility.

First Exemplary Embodiment

Figure 1:
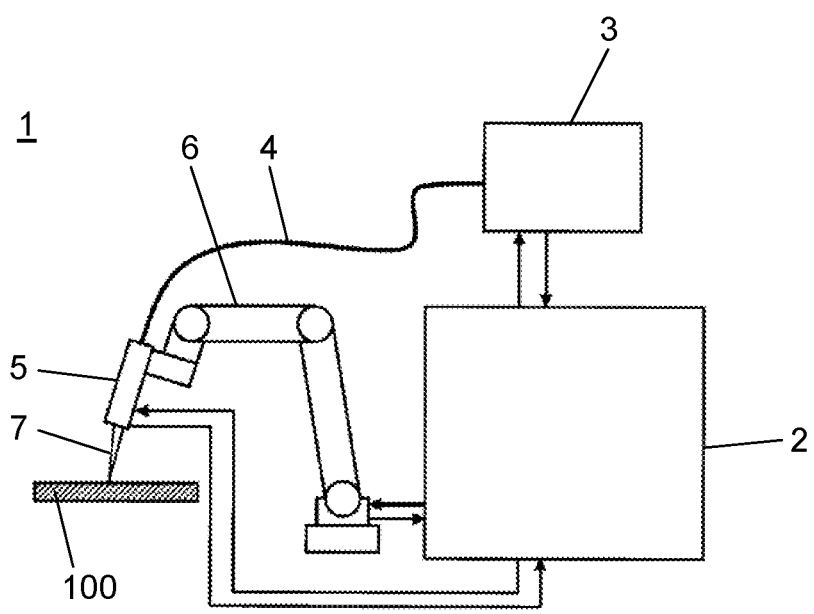
FIG. 1 is a schematic diagram illustrating a configuration of a laser welding machine according to a first exemplary embodiment.

A configuration of a laser welding machine according to a first exemplary embodiment of the present disclosure will be described with reference to FIG. 1. FIG. 1 is a schematic diagram illustrating a configuration of laser welding machine 1 according to the first exemplary embodiment of the present disclosure.

As illustrated in FIG. 1, laser welding machine 1 includes controller 2, laser oscillator 3, optical fiber 4, laser irradiation head 5, and robot 6.

Controller 2 is connected to laser oscillator 3, laser irradiation head 5, and robot 6. Controller 2 controls the operations of laser oscillator 3, laser irradiation head 5, and robot 6. Laser oscillator 3 outputs laser beam 7 based on an instruction from controller 2. Optical fiber 4 is connected to laser oscillator 3 and laser irradiation head 5 and transfers laser beam 7 to laser irradiation head 5 from laser oscillator 3. Laser irradiation head 5 is mounted to a tip of an arm of robot 6, and outputs laser beam 7 to workpiece 100 based on an instruction from controller 2. Robot 6 moves laser irradiation head 5 based on an instruction from controller 2.

Figure 2:
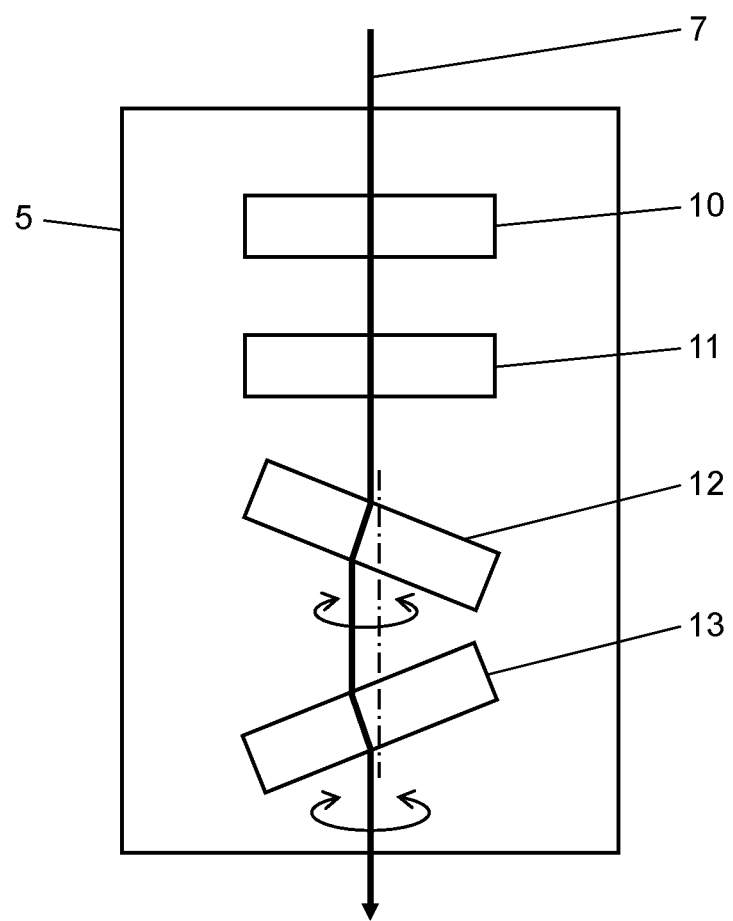
FIG. 2 is a schematic diagram illustrating a configuration of a laser irradiation head according to the first exemplary embodiment.

Next, a configuration of laser irradiation head 5 in the present exemplary embodiment will be described with reference to FIG. 2. FIG. 2 is a schematic diagram illustrating the configuration of laser irradiation head 5 according to the present exemplary embodiment.

As illustrated in FIG. 2, laser irradiation head 5 includes collimator lens 10, focus lens 11, parallel plate 12, and parallel plate 13.

Parallel plate 12 and parallel plate 13 are both connected to a motor (not illustrated), and rotate in response to an instruction from controller 2.

Next, an operation of laser welding machine 1 performing laser welding will be described with reference to FIGS. 1 and 2. Laser beam 7 output from laser oscillator 3 is transmitted to laser irradiation head 5 through optical fiber 4. Laser beam 7 entering laser irradiation head 5 is parallelized by collimator lens 10 provided inside laser irradiation head 5, and converged by focus lens 11. Then, laser beam 7 passes through two parallel plates 12 and 13 controlled by controller 2, whereby a laser irradiation position (focal distance) is determined, and workpiece 100 is irradiated with laser beam 7.

At that time, laser irradiation head 5 rotates parallel plate 12 and parallel plate 13 provided inside laser irradiation head 5, thereby being capable of rotating laser beam 7 to have a circular trajectory and causing laser beam 7 to move while rotating. Further, laser irradiation head 5 can be moved by robot 6.

According to the configuration described above, the irradiation position of laser beam 7 can be moved in a weld region of workpiece 100.

The irradiation position of laser beam 7 can be moved in a helical fashion on workpiece 100, by controller 2 simultaneously controlling laser oscillator 3, laser irradiation head 5, and robot 6.

Specifically, laser welding machine 1 can irradiate workpiece 100 with laser beam 7 by rotating laser beam 7, and can relatively move laser irradiation head 5 relative to workpiece 100 in a welding direction (hereinafter referred to as welding direction X) which is a direction of progress of the welding. Laser welding machine 1 can perform welding by irradiating workpiece 100 with laser beam along a helical trajectory whose center of rotation moves in welding direction X. The "helical trajectory whose center of rotation moves in welding direction X" will be described later as trajectory 50 with reference to FIG. 3A. In the following description, workpiece 100 (upper plate 8 and lower plate 9) is used for an object to be welded.

In the present exemplary embodiment, the irradiation position of laser beam 7 is moved by laser irradiation head 5 and robot 6. However, other components such as a galvano scanner may be used, so long as they can change the irradiation position of the laser beam such that the laser beam moves along a helical trajectory.

Next, the laser welding method according to the present disclosure will be described.

It should be noted that, although terms such as a "first welding step" and a "second welding step" are used in the following description, they are used for facilitating understanding of the exemplary embodiments, and do not necessarily limit the order of welding steps. In addition, these terms do not limit the number of times of welding steps, and the like.

Firstly, a process of the first welding step will be described with reference to FIGS. 3A and 3B.

Figure 3A:
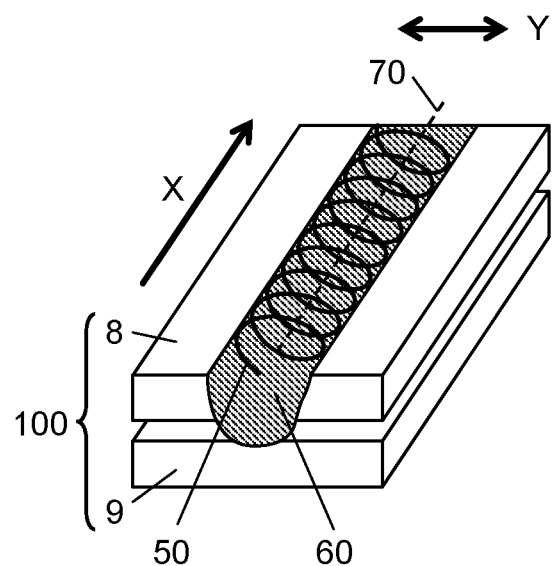
FIG. 3A is a perspective view of an object to be welded for describing a laser welding method according to the first exemplary embodiment.
Figure 3B:
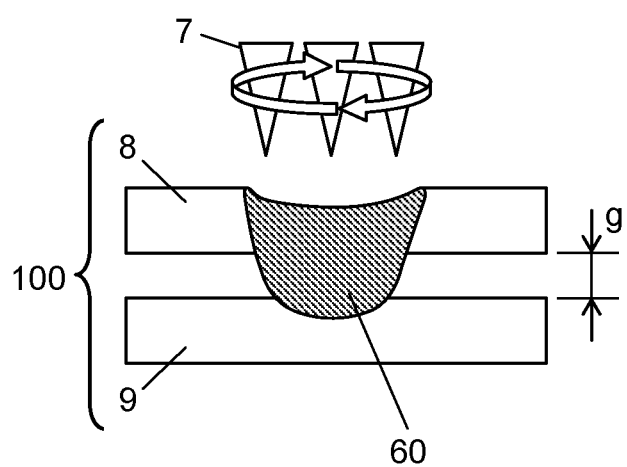
FIG. 3B is a sectional view of the object to be welded for describing the laser welding method according to the first exemplary embodiment.

As illustrated in FIGS. 3A and 3B, laser beam 7 moves in welding direction X while rotating, and therefore, the center of rotation of laser beam 7, which is rotating, moves in welding direction X. An actual operation is performed such that controller 2 rotates two parallel plates 12 and 13 of laser irradiation head 5 to output laser beam 7 in a circular form. Simultaneously, controller 2 moves robot 6, so that laser irradiation head 5 moves in welding direction X relative to workpiece 100 (upper plate 8 and lower plate 9). Thus, the laser beam is output to describe a helical trajectory. That is, trajectory 50 of laser beam 7 is a helical trajectory extending along welding direction X as a whole. In other words, workpiece 100 (upper plate 8 and lower plate 9) is irradiated with laser beam 7 along helical trajectory 50 around the center of rotation moving in welding direction X. A line passing through the center of rotation which continuously moves is illustrated as centerline 70 in FIG. 3A. In the laser welding method according to the present disclosure, workpiece 100 is an object to be welded.

As illustrated in FIGS. 3A and 3B, due to the irradiation of laser beam 7 along a helical trajectory, an irradiation zone of laser beam 7 is expanded, whereby molten metal in an amount capable of filling gap g between upper plate 8 and lower plate 9 can be ensured.

The part where the metal is melted (molten metal) is weld bead 60 formed by the first welding step. Examples of the method for expanding the irradiation zone by scanning laser beam 7 also include weaving, besides the above-mentioned method.

Figure 3C:
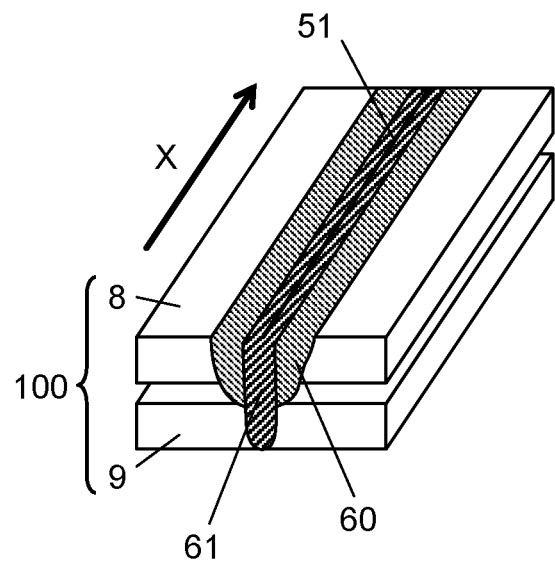
FIG. 3C is a perspective view of the object to be welded for describing the laser welding method according to the first exemplary embodiment.
Figure 3D:
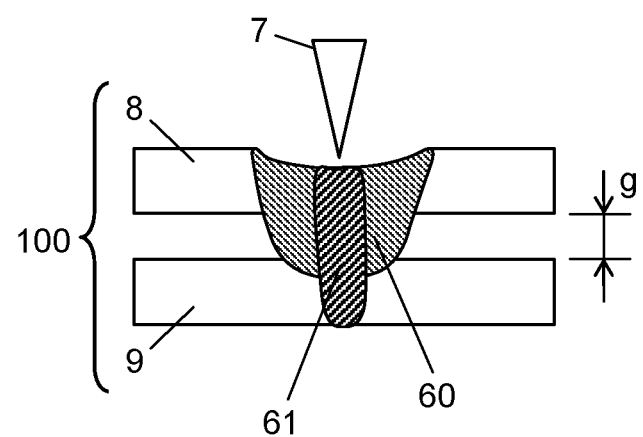
FIG. 3D is a sectional view of the object to be welded for describing the laser welding method according to the first exemplary embodiment.

Next, a process of the second welding step will be described with reference to FIGS. 3C and 3D.

In the second welding step, laser beam 7 is rotated with a diameter smaller than the diameter of the rotation of laser beam 7 in the first welding step. The trajectory of laser beam 7 in the second welding step is the same as trajectory 50 illustrated in FIG. 3A except for the diameter, and the description thereof will not be repeated below.

In the second welding step, the irradiation zone of the laser beam needs to be made narrower than that in the first welding step. For example, the radius of the circular trajectory of laser beam 7 by parallel plate 12 and parallel plate 13 (illustrated in FIG. 2) is set smaller in the second welding step than in the first welding step. That is, in the second welding step, laser beam 7 is rotated with a diameter smaller than the diameter in the first welding step. Due to the second welding step, weld bead 61 is additionally formed as illustrated in FIGS. 3C and 3D.

Next, another process of the second welding step will be described with reference to FIGS. 3C and 3D.

As another process of the second welding step, laser beam 7 is linearly moved without being rotated. Trajectory 51 of laser beam 7 is illustrated in FIG. 3C. While trajectory 51 of laser beam 7 is linear in the present exemplary embodiment, it is not necessarily linear, and may be a curved line.

In the present disclosure, the first welding step and the second welding step do not limit the number of welding steps. For example, if the gap between upper plate 8 and lower plate 9 is large, the same part may be irradiated with laser beam 7 twice or more to firmly form a bridge between upper plate 8 and lower plate 9 in the first welding step. After the irradiation of laser beam 7 twice or more, the second welding step may be performed to weld upper plate 8 and lower plate 9. In the second welding step, weld bead 60 formed in the first welding step is irradiated with laser beam 7. The state after the second welding step is performed is illustrated in FIGS. 3C and 3D.

Next, a specific processing example of the present exemplary embodiment will be described. A case where workpiece 100 is welded will be described. In Workpiece 100, upper plate 8 has a thickness of 2.3 mm, lower plate 9 has a thickness of 1.2 mm, and gap g between upper plate 8 and lower plate 9 is 0.5 mm. The material of upper plate 8 and lower plate 9 is soft steel (for example, a cold rolled steel plate).

A condition for the first welding step is such that a laser output is 4 kW, a welding speed is 2.0 m/min, and a diameter of rotation of laser beam 7 is 2.0 mm. A condition for the second welding step is such that the diameter of rotation of laser beam 7 is set smaller than 2.0 mm which is the diameter of rotation in the first welding step. For example, the diameter of rotation of laser beam 7 may be set to 1.0 mm which is a half of the diameter of rotation in the first welding step. The condition for the second welding step is the same as the condition for the first welding step except for the diameter of rotation.

In laser welding, when a liquid phase which has once been melted is again irradiated with laser beam 7, internal cracks are likely to occur. In view of this, the start point of the weld in the second welding step is set to be the same as the start point of the weld in the first welding step, for example. According to this configuration, during the period from the end of the first welding step until the start of the second welding step, there is a time for moving laser irradiation head 5 in which robot 6 returns laser irradiation head 5 to the start point of the weld in the first welding step. During the time for moving laser irradiation head 5, the liquid phase which has been melted in the first welding step is solidified to be a solid phase. Therefore, in the second welding step, the solid phase of the weld bead which has once been melted in the first welding step is irradiated with laser beam 7, which can suppress the generation of internal cracks.

Since welding conditions vary depending on various factors such as a material or thickness of the workpiece, or beam quality or beam diameter of the laser beam, appropriate conditions determined in advance through experiments, for example, may be used.

Next, the effects of the first exemplary embodiment of the present disclosure will be described. In the first welding step, laser beam 7 is relatively moved in the welding direction relative to workpiece 100 (upper plate 8 and lower plate 9) in a state where laser beam 7 is rotated. That is, in the first welding step, welding is performed with the irradiation zone of laser beam 7 being expanded. Accordingly, in the first welding step, an amount of molten metal of upper plate 8 is large, and thus, the welding is performed without causing burn through even if there is large gap g between upper plate 8 and lower plate 9.

However, in the first welding step, the penetration depth is low, so that a sufficient welding strength cannot be obtained between upper plate 8 and lower plate 9. In view of this, the second welding step is performed. At the start of the second welding step, upper plate 8 and lower plate 9 have been bridged by the first welding step, and thus, it is unnecessary to widen the weld bead. Therefore, in the second welding step, the welding is performed such that the irradiation zone of laser beam 7 is set narrower than the irradiation zone in the first welding step.

Accordingly, the second welding step has higher energy density than the first welding step. Weld bead 61 formed by the second welding step is narrower than weld bead 60 formed by the first welding step, and thus, the welding with a high penetration depth can be implemented. Due to the execution of the second welding step after the first welding step, burn through caused by gap g can be suppressed, and welding with a wide bead and high penetration depth can be implemented.

As described above, in the first exemplary embodiment of the present disclosure, laser beam 7 can mechanically be controlled such that the irradiation position of laser beam 7 relatively moves, while rotating, with respect to an object to be welded (workpiece 100), whereby the width of weld bead 60 can be precisely controlled to enable welding with high reproducibility.

In the first exemplary embodiment of the present disclosure, after the first welding step for ensuring a penetration depth, the second welding step is performed in which laser beam 7 is relatively moved in the welding direction while rotating with a diameter smaller than the diameter of the rotation in the first welding step, or in which linear welding is performed for moving laser beam 7 in the welding direction. That is, at least two or more welding steps are performed, whereby, even if there is gap g between upper plate 8 and lower plate 9, burn through can be suppressed, and hole formation can be prevented.

That is, the laser welding method according to the present disclosure includes a first step for forming weld bead 60 by irradiating an object to be welded (upper plate 8 and lower plate 9) with laser beam 7 along helical trajectory 50 around a center of rotation which moves in welding direction X. Note that the line passing through the center of rotation is illustrated as centerline 70 in FIG. 3A. The laser welding method according to the present disclosure also includes a second step for irradiating the object to be welded (upper plate 8 and lower plate 9) with laser beam 7 along a helical trajectory (not illustrated) around a center of rotation which moves in welding direction X.

A diameter of rotation of laser beam 7 around the center of rotation in the first step is larger than a diameter of rotation of laser beam 7 around the center of rotation in the second step.

Note that, in the second step, the object to be welded is not necessarily irradiated with laser beam 7 along the helical trajectory. As another process of the second step, weld bead 60 of the object to be welded (upper plate 8 and lower plate 9) formed by the first step may be irradiated with linear laser beam 7 along welding direction X. The trajectory of laser beam 7 in the second step is illustrated as trajectory 51 in FIG. 3C.

Second Exemplary Embodiment

Next, a second exemplary embodiment will be described with reference to FIGS. 3A, 4A, and 4B. The configuration of a laser welding machine is the same as that in the first exemplary embodiment, and the description of the laser welding machine used in the second exemplary embodiment will be omitted.

The second exemplary embodiment is different from the first exemplary embodiment in that a weld centerline, as a centerline (weld target position) in a width direction, is changed between weld bead 60 formed by the first welding step and a weld bead formed by the second welding step.

That is, in the first exemplary embodiment, the weld centerline in the first welding step and the weld centerline in the second welding step are the same.

FIG. 4A illustrates the state of a weld bead where a weld centerline in the second welding step is set to be the same as centerline 701 in the welding by the first welding step.

FIG. 4B illustrates the state of a weld bead where the weld centerline in the second welding step is shifted, by a, from centerline 701 in the welding by the first welding step.

In the welding in which laser beam 7 is output in a helical fashion, a penetration state is different between the left side and the right side relative to the welding direction in the first welding step, as illustrated in FIGS. 4A and 4B. In other words, weld bead 601 is not symmetrical.

A case where, as illustrated in FIG. 3A, laser beam 7 is rotated in a clockwise direction, as viewed from laser beam 7, relative to the welding direction will be described. In this case, a speed vector component is generated in the direction opposite to the welding direction, due to the rotation of the laser beam, on the right side from a weld centerline (hereinafter referred to as centerline 701) with respect to welding direction X. Therefore, the welding speed is low, and heat is likely to be trapped on the right side.

On the other hand, a speed vector component is generated in the welding direction, due to the rotation of laser beam 7, on the left side from centerline 701 for the welding (centerline 70 of rotation of laser beam 7 in width direction Y of the weld bead) in welding direction X. Therefore, the welding speed is high, and heat is likely to escape on the left side.

Accordingly, when the welding is performed by rotating laser beam 7 in the clockwise direction, as viewed from laser beam 7, with respect to welding direction X, the penetration depth is high on the right side with respect to welding direction X, as illustrated in FIG. 4A, after the first welding step is ended.

Now, a case where the second welding step is performed by aiming centerline 701 for the welding in the first welding step, with the penetration depth on the right side with respect to welding direction X being high will be described with reference to FIG. 4A.

When the second welding step is performed by aiming centerline 701 for the welding in the first welding step, a portion where there is gap g between upper plate 8 and lower plate 9 is to be welded. Even by the second welding step, upper plate 8 and lower plate 9 are not bridged near centerline 701 as illustrated in FIG. 4A, and thus, a weld joint strength is low.

Subsequently, an example where centerline 702 for the welding in the second welding step is shifted from centerline 701 in the first welding step will be described with reference to FIG. 4B. In the example in FIG. 4B, the second welding step is performed after the first welding step with the aimed position being changed. In the second welding step, laser beam 7 is output by aiming a portion with a high penetration depth, due to a large heat input, on weld bead 602 formed by the first welding step. Upper plate 8 and lower plate 9 are irradiated with laser beam 7 such that the irradiation position moves, while rotating, in welding direction X as a whole. At that time, in the second welding step, weld bead 612 is formed within width y1 of weld bead 602 formed by the first welding step. The position of centerline 701 in the width direction of weld bead 602 formed by the first welding step and the position of centerline 702 in the width direction of weld bead 612 formed by the second welding step are different from each other. In the present exemplary embodiment, the welding is performed such that centerline 702 is shifted to the right from centerline 701 in FIG. 4B. Note that, in the second welding step, laser beam 7 is not necessarily rotated, and may be linearly output for welding, as described above.

Specifically, in the laser welding method according to the present exemplary embodiment, centerline 701 which is a trajectory of a center of rotation moving in the welding direction in the first welding step extends along welding direction X, centerline 702 which is a trajectory of a center of rotation moving along the welding direction in the second welding step extends along welding direction X, and centerline 701 and centerline 702 are shifted from each other in one direction in a plan view.

In addition, when the second laser welding step performs linear welding, centerline 701 which is a trajectory of a center of rotation moving in the welding direction in the first welding step extends along the welding direction, and centerline 701 and a trajectory of laser beam 7 in the second welding step are shifted from each other in one direction in a plan view.

Note that, in the present exemplary embodiment, the wording "in a plan view" means that the workpiece is viewed from top or from bottom in FIG. 4B, for example.

In the present exemplary embodiment, the direction of rotation of laser beam 7 in the first welding step is a clockwise direction as viewed from laser beam 7, and the center of rotation (centerline 702) in the second welding step is shifted to the right from the center of rotation (centerline 701) in the first welding step with respect to welding direction X.

If the direction of rotation of laser beam 7 in the first welding step is a counterclockwise direction as viewed from laser beam 7, the center of rotation (centerline 702) in the second welding step is shifted to the left from the center of rotation (centerline 701) in the first welding step with respect to welding direction X.

If linear welding is performed in the second welding step of the laser welding method according to the present exemplary embodiment, the direction of rotation of laser beam 7 in the first welding step is a clockwise direction as viewed from laser beam 7, and a trajectory of laser beam 7 in the second welding step is shifted to the right from the center of rotation (centerline 701) in the first welding step with respect to welding direction X.

If the direction of rotation of laser beam 7 in the first welding step is a counterclockwise direction as viewed from laser beam 7, a trajectory of laser beam 7 in the second welding step is shifted to the left from the center of rotation (centerline 701) in the first welding step with respect to welding direction X.

In the present exemplary embodiment, the second welding step is performed to the molten weld pool or weld bead 602 bridged by the first welding step by aiming at a portion which is near the weld centerline (centerline 701) of the weld bead formed by the first welding step and which has a high penetration depth within width y1 of weld bead 602 formed by the first welding step, whereby upper plate 8 and lower plate 9 can be welded at a portion having no gap g therebetween. Accordingly, in the present exemplary embodiment, upper plate 8 and lower plate 9 are more firmly bridged. Thus, the present exemplary embodiment enables welding with a high penetration depth without causing hole formation. Consequently, a weld joint strength is enhanced.

When welding by the second welding step is performed to an area beyond width y1 of weld bead 601 formed in the first welding step, an unbridged portion of upper plate 8 and lower plate 9 is also irradiated with laser beam 7. Therefore, the portion having gap g is also irradiated with laser beam 7, so that the possibility of occurrence of hole formation may be increased.

Next, a specific processing example will be described. Upper plate 8 and lower plate 9 which are soft steel are used, wherein the thickness of upper plate 8 is 2.3 mm, the thickness of lower plate 9 is 1.2 mm, and gap g between upper plate 8 and lower plate 9 is 0.5 mm. A case where workpiece 100 (upper plate 8 and lower plate 9) described above is welded will be described. The first welding step is performed under a condition such that a laser output is 4 kW, a welding speed is 2.0 m/min, and a diameter of rotation of a laser beam is 2.0 mm. In the second welding step, a diameter of rotation is set smaller than the diameter of rotation in the first welding step. For example, in the second welding step, the diameter of rotation of the laser beam is set to be 1.0 mm which is a half of the diameter of rotation in the first welding step, and the other conditions are set to be the same as the conditions for the first welding step.

In the present exemplary embodiment, welding is performed in the first welding step such that laser beam 7 is rotated in a helical fashion in a clockwise direction with respect to welding direction X. When welding is performed in a helical fashion in the second welding step, centerline 702 is shifted, by 0.5 mm, to the right in the parallel direction from centerline 701 for the welding in the first welding step. In FIG. 4B, a=0.5 mm. Thus, upper plate 8 and lower plate 9 are bridged, whereby welding with a high penetration depth and a high weld joint strength can be achieved.

When linear welding is performed in the second welding step, centerline 702 may be shifted from centerline 701 for the welding in the first welding step by 0.5 mm, as in the case where the welding in the second welding step is performed in a helical fashion.

One example of the welding conditions has been described above. However, it should be noted that, since the welding conditions vary depending on various factors such as a material or thickness of workpiece 100, or beam quality or beam diameter of laser beam 7, appropriate conditions determined in advance through experiments, for example, may be used.

As described above, in the second exemplary embodiment in the present disclosure, the position of the centerline in the first welding step and the position of the centerline in the second welding step are different from each other, whereby the occurrence of burn through can be suppressed, for example.

Third Exemplary Embodiment

A third exemplary embodiment will be described with reference to FIGS. 5A and 5B. The configuration of laser welding machine 1 is the same as that in the first exemplary embodiment, and the description thereof will not be repeated below. The third exemplary embodiment is different from the first exemplary embodiment in that the direction of rotation of laser beam 7 in welding in a helical fashion in the second welding step is reverse to the direction of rotation of laser beam 7 in welding in a helical fashion in the first welding step.

Figure 5A:
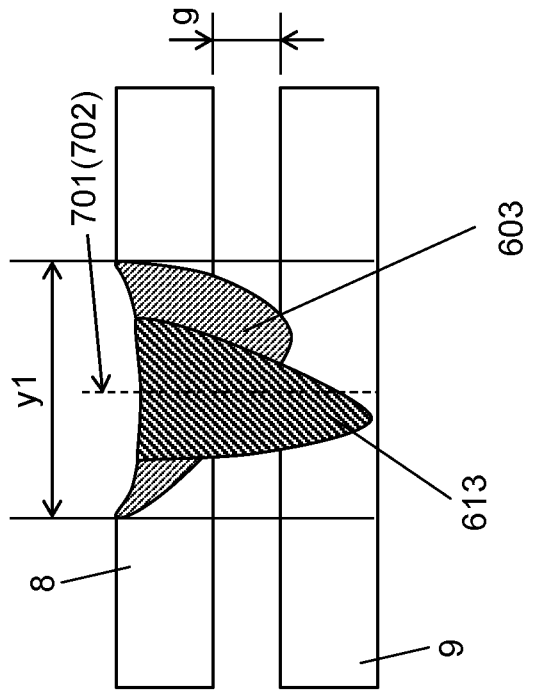
FIG. 5A is a view illustrating a cross section of an object to be welded in a third exemplary embodiment.
Figure 5B:
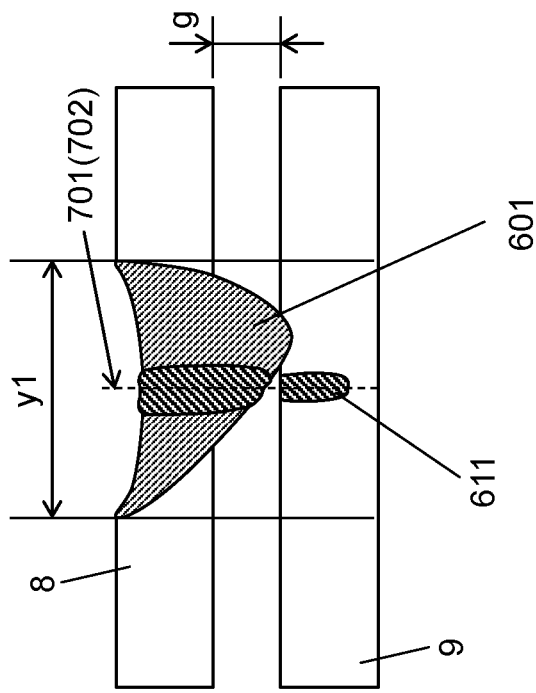
FIG. 5B is a view illustrating the cross section of the object to be welded in the third exemplary embodiment.
Figure 8:
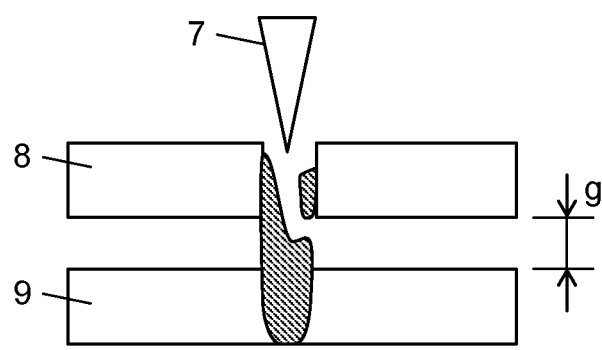
FIG. 8 is a view illustrating a cross section of an object to be welded by a conventional welding method.

As illustrated in FIGS. 5A and 5B, a penetrated position is shifted to the right from centerline 701 for the welding in the first welding step. The state after the first welding step is the same as the state illustrated in FIG. 4A in the second exemplary embodiment, so that the description thereof will not be repeated below.

In the next second welding step, the position same as centerline 701 for the welding in the first welding step is aimed. In FIG. 5A, the direction of rotation of laser beam 7 in the second welding step is the same as the direction of rotation of laser beam 7 in the first welding step. On the other hand, in FIG. 5B, the direction of rotation of laser beam 7 in the second welding step is reverse to the direction of rotation of laser beam 7 in the first welding step.

As illustrated in FIG. 5B, when the direction of rotation of the laser beam in the second welding step is reversed, weld bead 613 formed by the second welding step is shifted to the left. As a result, gap g formed in the first welding step is filled by the second welding step, whereby a highly strong weld joint with a large weld width and a high penetration depth can be achieved, for example.

Next, a specific processing example of the present exemplary embodiment will be described. A case where workpiece 100 (for example, cold rolled steel plate) which is made of soft steel is used will be described, wherein upper plate 8 has a thickness of 2.3 mm, lower plate 9 has a thickness of 1.2 mm, and gap g between upper plate 8 and lower plate 9 is 0.5 mm.

A condition for the first welding step is such that a laser output is 4 kW, a welding speed is 2.0 m/min, and a diameter of rotation of a laser beam is 2.0 mm. A condition for the second welding step is set such that a diameter of rotation in the second welding step is set smaller than the diameter of rotation in the first welding step. For example, the diameter of rotation of laser beam 7 may be set as 1.5 mm which is ¾ of the diameter of rotation in the first welding step. The condition for the second welding step is the same as the condition for the first welding step except for the diameter of rotation.

In the present exemplary embodiment, laser beam 7 is rotated in a clockwise direction, as viewed from laser beam 7, in the first welding step, and laser beam 7 is rotated in a counterclockwise direction, as viewed from laser beam 7, in the second welding step.

In other words, in the present exemplary embodiment, the direction of rotation of laser beam 7 in the first welding step is reverse to the direction of rotation of laser beam 7 in the second welding step.

According to this configuration, gap g between upper plate 8 and lower plate 9 can be filled, whereby a highly strong weld joint with a large weld width can be achieved, for example.

It should be noted that, since welding conditions vary depending on various factors such as a material or thickness of the workpiece, or beam quality or beam diameter of the laser beam, appropriate conditions determined in advance through experiments, for example, may be used.

As described above, in the third exemplary embodiment in the present disclosure, the direction of rotation in the first welding step and the direction of rotation in the second welding step are set to be reverse to each other, and thus, welding with a uniform and large weld width can be implemented, for example.

Fourth Exemplary Embodiment

Next, a fourth exemplary embodiment will be described with reference to FIG. 6. The configuration of laser welding machine 1 is the same as that in the first exemplary embodiment, and the description thereof will not be repeated below. The fourth exemplary embodiment is different from the first exemplary embodiment or the second exemplary embodiment in that, in the first welding step and/or the second welding step, a heat input is varied between the right side and the left side with respect to weld centerline 70 (or weld target position) of weld bead 60 in width direction Y.

For example, when laser beam 7 is rotated in a clockwise direction as viewed from the irradiation side of laser beam 7, heat is likely to be trapped and the penetration depth tends to be high on the right side with respect to welding direction X. Therefore, a control parameter is adjusted to decrease an amount of heat input on the right side with respect to welding direction X.

Examples of the control parameters include a laser output and a welding speed, and the amount of heat input can be lowered through the adjustment of the control parameters, such as by lowering the laser output or by increasing the welding speed.

A specific processing example in the present exemplary embodiment will be described. A case where a workpiece (for example, cold rolled steel plate) which is made of soft steel is welded will be described, wherein upper plate 8 has a thickness of 2.3 mm, lower plate 9 has a thickness of 1.2 mm, and gap g between upper plate 8 and lower plate 9 is 0.5 mm. A condition for the first welding step is such that an average laser output is 4 kW, an average welding speed is 2.0 m/min, and a diameter of rotation of a laser beam is 2.0 mm.

In the first welding step, welding is performed such that the laser output is 3 kW and the welding speed is 3.0 m/min on the right side from the rotational centerline of trajectory 50 of laser beam 7 (centerline 70 of rotation of the laser beam in the width direction of the weld bead) with respect to welding direction X, and such that the laser output is 5 kW and the welding speed is 1.0 m/min on the left side from the rotational centerline of trajectory 50 of laser beam 7 (centerline 70 of rotation of the laser beam in the width direction of the weld bead) with respect to welding direction X.

That is, according to the laser welding method in the present exemplary embodiment, an amount of heat input of laser beam 7 is varied in the first welding step or the second welding step according to welding direction X and the direction of rotation of laser beam 7 (clockwise direction or counterclockwise direction). If linear welding is performed in the second welding step, the amount of heat input of laser beam 7 can be varied only in the first welding step according to welding direction X and the direction of rotation of laser beam 7.

Specifically, when laser beam 7 is rotated in a clockwise direction, as viewed from the laser beam, in the first welding step or the second welding step as illustrated in FIG. 6, an amount of heat input is lower on the right side than on the left side from the rotational center (centerline 70) of trajectory 50 of laser beam 7 with respect to welding direction X.

On the contrary, when laser beam 7 is rotated in a counterclockwise direction, as viewed from laser beam 7, in the first welding step or the second welding step, an amount of heat input may be lower on the left side than on the right side from the rotational center (centerline 70) of trajectory 50 of the laser beam with respect to welding direction X.

In the second welding step, the diameter of rotation in the second welding step is set smaller than the diameter of rotation in the first welding step. For example, the diameter of rotation of laser beam 7 is set to be 1.0 mm which is a half of the diameter of rotation in the first welding step, and the other welding conditions are set to be the same as the welding conditions for the first welding step.

According to this configuration, the balance of the heat input is made uniform between the left side and the right side with respect to centerline 70 of rotation of trajectory 50 of laser beam 7 (centerline 70 of rotation of the laser beam in the width direction of the weld bead), whereby stable welding with a uniform penetration depth can be implemented, for example.

It should be noted that, since welding conditions vary depending on various factors such as a material or thickness of the workpiece, or beam quality or beam diameter of the laser beam, appropriate conditions determined in advance through experiments, for example, may be used.

As described above, in the fourth exemplary embodiment in the present disclosure, when the irradiation position of laser beam 7 moves while rotating, a heat input is varied between the left side and the right side with respect to centerline 70 of the rotation of laser beam 7 on weld bead 60 in consideration of the heat balance between the left side and the right side, whereby weld bead 60 having a uniform penetration depth can be achieved, for example.

Fifth Exemplary Embodiment

A fifth exemplary embodiment will be described with reference to FIGS. 7A and 7B. The configuration of laser welding machine 1 is the same as that in the first exemplary embodiment, and the description thereof will not be repeated below. The fifth exemplary embodiment is different from the other exemplary embodiments in that a cooling time is provided between the first welding step and the second welding step.

FIG. 7A illustrates a case where the second welding step is started just after the laser is once turned off at the end of the first welding step. In this case, if the weld length is short, the second welding step is started before the weld molten pool formed by the first welding step is cooled and solidified. Accordingly, the molten liquid phase is again irradiated with the laser beam, which may increase the possibility of generation of internal cracks such as blowhole. FIG. 7B illustrates a case where a predetermined cooling time sufficient for cooling is provided after the first welding step is ended. Due to the cooling time being provided, welding is surely performed on a solid phase in the second welding step. Note that the cooling time may be optimized according to a solidification time, and the solidification time is controlled particularly based on a material, a thickness, or an amount of heat input.

A specific processing example in the present exemplary embodiment will be described. A case where workpiece 100 (for example, cold rolled steel plate) which is made of soft steel is welded will be described, wherein upper plate 8 has a thickness of 2.3 mm, lower plate 9 has a thickness of 1.2 mm, and gap g between upper plate 8 and lower plate 9 is 0.5 mm. A condition for the first welding step is such that a laser output is 4 kW, a welding speed is 2.0 m/min, and a diameter of rotation of laser beam is 2.0 mm. To solidify molten weld bead 60 formed by the first welding step after the first welding step is ended, a cooling time of 1 sec is provided as a waiting time before the start of the second welding step, and after the cooling time, the second welding step is started. A condition for the second welding step is set such that a diameter of rotation of laser beam 7 in the second welding step is set smaller than the diameter of rotation in the welding in the first welding step.

For example, in the second welding step, the diameter of rotation of laser beam 7 is set to be 1.0 mm which is a half of the diameter of rotation of laser beam 7 in the first welding step. The other welding conditions are set to be the same as the welding conditions for the first welding step.

According to this configuration, welding is surely performed on a solid phase of weld bead 60 which has once been melted during the first welding step, whereby internal cracks can be suppressed, for example.

Since the welding conditions vary depending on various factors such as a material or thickness of the workpiece, or beam quality or beam diameter of the laser beam, appropriate conditions determined in advance through experiments, for example, may be used.

As described above, in the fifth exemplary embodiment in the present disclosure, a time for cooling is provided after the end of the first welding step, and the second welding step is performed such that a solid phase is irradiated with the laser beam, whereby internal cracks can be suppressed, and a high-quality weld result can be achieved, for example.

Sixth Exemplary Embodiment

A sixth exemplary embodiment will be described with reference to FIG. 7B. The configuration of laser welding machine 1 is the same as that in the first exemplary embodiment, and the description thereof will not be repeated below.

In the sixth exemplary embodiment, a welding condition is changed such that a laser output in the first welding step is set higher than a laser output in the second welding step, or a welding time in the first welding step is set longer than a welding time in the second welding step. As illustrated in FIG. 7B, an amount of heat input (laser output) is different between the welding in the first welding step and the welding in the second welding step.

In the first welding step, laser beam 7 is scanned in a helical fashion in order to expand the irradiation zone of laser beam 7. On the other hand, in the second welding step, the laser beam is output in a zone narrower than the zone in the first welding step, because it is necessary to irradiate, with the laser beam, the portion of upper plate 8 and lower plate 9 where gap g is filled (where the penetration depth is high) by the welding in the first welding step.

At that time, if the welding in the second welding step is performed with a laser output and welding speed same as those in the first welding step, a heat input is concentrated on a certain part due to the irradiation zone being narrow, and thus, burn through is likely to occur.

In view of this, in the second welding step, the welding condition is adjusted such that, for example, the laser output is set lower than the laser output in the first welding step or the welding speed is set higher than the welding speed in the first welding step. According to such adjustment, the occurrence of burn through, which is caused by an excessive heat input due to concentration of heat input, can be suppressed. It is to be noted that the amount of heat input may be adjusted only by controlling the laser output, only by controlling the welding speed, or by controlling both the laser output and welding speed.

In addition, such adjustment may be performed in the second welding step that, for example, a laser output is set lower than that in the first welding step and a welding speed is set lower than that in the first welding step, so long as a total amount of heat input can consequently be decreased.

A specific processing example in the present exemplary embodiment will be described. A case where a workpiece (for example, cold rolled steel plate) which is made of soft steel is welded will be described, wherein upper plate 8 has a thickness of 2.3 mm, lower plate 9 has thickness t of 1.2 mm, and gap g between upper plate 8 and lower plate 9 is 0.5 mm. A condition for the first welding step (welding in a helical fashion) is such that a laser output is 4 kW, a welding speed is 2.0 m/min, and a diameter of rotation of a laser beam is 2.0 mm. After the first welding step, welding in the second welding step is performed on weld bead 60 formed by the first welding step. When the welding in the second welding step is performed in a helical fashion, a condition for the second welding step is such that a laser output is 3.0 kW, a diameter of rotation of the laser beam is 0.5 mm, and a welding speed is 2.5 m/min. Note that linear welding may be performed in the second welding step.

According to the process described above, the occurrence of burn through, which is caused by an excessive heat input, can be suppressed.

Since the welding conditions vary depending on various factors such as a material or thickness of the workpiece, or beam quality or beam diameter of the laser beam, appropriate conditions determined in advance through experiments, for example, may be used.

As described above, in the sixth exemplary embodiment in the present disclosure, an amount of heat input is changed between the first welding step and the second welding step, whereby the occurrence of burn through due to excessive heat input can further be suppressed, for example.

As described above, according to the present disclosure, laser beam 7 can mechanically be controlled such that the irradiation position of laser beam 7 is relatively moved while rotating, whereby the width of weld bead 60 can be precisely controlled to enable welding with high reproducibility.

In addition, at least two or more welding steps are performed, which include a first welding step for forming weld bead 60 by irradiating workpiece 100 (object to be welded) with laser beam 7 for filling gap g along a helical trajectory in which the irradiation position is relatively moved while rotating, and a second welding step, for ensuring a penetration depth, in which welding in a helical fashion is executed such that laser beam 7 is rotated with a diameter smaller than the diameter of rotation of laser beam 7 in the first welding step and relatively moved in the welding direction. Thus, even if there is gap g between workpieces (between upper plate 8 and lower plate 9), burn through can be suppressed, whereby the workpieces can be welded without having hole formation, for example.

It is to be noted that, in the second welding step, laser beam 7 is not necessarily rotated, and linear welding in which laser beam 7 is moved on a straight line or on a line may be executed.

Moreover, in the present disclosure, as described with reference to FIG. 4B, for example, weld bead 602 may be formed by welding in the first welding step by irradiating objects to be welded (upper plate 8 and lower plate 9) with laser beam 7 such that laser beam 7 relatively moves in weld direction X while rotating, and weld bead 60 may be formed, by welding in the second welding step, on weld bead 602, which has been formed by the first welding step, near centerline 701 of weld bead 602 in width direction Y and within width y1 of weld bead 60, by irradiation of laser beam 7 such that laser beam 7 is moved in the welding direction. The position of centerline 701 in width direction Y of weld bead 602 formed by the first welding step and the position of centerline 702 in width direction Y of weld bead 602 formed by the second welding step are made different from each other. The position of the weld centerline is changed between the first welding step and the second welding step, whereby an occurrence of burn through can further be suppressed.

In addition, in the present disclosure, as described with reference to FIG. 5B, for example, weld bead 603 is formed by welding in the first welding step by irradiating objects to be welded (upper plate 8 and lower plate 9) with laser beam 7 such that laser beam 7 relatively moves in welding direction X while rotating, and weld bead 613 is formed by welding in the second welding step on weld bead 603, formed by the first welding step, near weld centerline 701 of weld bead 603 formed in the first welding step by irradiation of laser beam 7 such that laser beam 7 relatively moves in the welding direction while rotating with a diameter smaller than that in the first welding step. At that time, the direction of rotation in the second welding step is made different from the direction of rotation in the first welding step, that is, the direction of rotation is different between the first welding step and the second welding step, whereby welding with uniform and large weld width can be achieved, for example.

Moreover, in the present disclosure, as described with reference to FIG. 6, for example, a laser beam is output such that an amount of heat input on the trajectory of laser beam 7 varies according to a combination of welding direction X and the direction of rotation of laser beam 7 which is moved. According to this configuration, weld bead 60 is formed by welding in the first welding step by irradiating an object to be welded (workpiece 100) with laser beam 7 such that laser beam 7 relatively moves in the welding direction while rotating, and when the irradiation position of laser beam 7 is rotated, a heat input is varied between the left side and the right side with respect to centerline 70 of rotation of laser beam 7 in consideration of a heat balance between the left side and the right side. Thus, a weld bead with a uniform penetration depth can be achieved, for example.

It is to be noted that, when laser beam 7 is rotated in the second welding step, the same effect as in the first welding step can be obtained, if a heat input is varied between the left side and the right side with respect to the centerline of rotation of laser beam 7, as in the first welding step, in consideration of the heat balance between the left side and the right side when the irradiation position of laser beam 7 is rotated.

Furthermore, in the present disclosure, if laser beam 7 is rotated in a clockwise direction with respect to welding direction X, an amount of heat input on the right side is set lower than that on the left side in the width direction of weld bead 60 relative to welding direction X with respect to the center of rotation (a line (a trajectory of the centerline of rotation) passing through the center of rotation moving in the welding direction is illustrated as centerline 70) of laser beam 7 in width direction Y of weld bead 60. If laser beam 7 is rotated in a counterclockwise direction with respect to welding direction X, an amount of heat input on the left side is set lower than that on the right side in the width direction of the weld bead relative to welding direction X with respect to the center of rotation (a line passing through the center of rotation moving in the welding direction is illustrated as centerline 70) of laser beam 7 in width direction Y of weld bead 60. According to the configuration in which weld bead 60 is formed by irradiating the object to be welded (workpiece 100) with laser beam 7 such that laser beam 7 relatively moves in welding direction X while rotating, and a heat input is varied between the left side and the right side with respect to centerline 70 of rotation of laser beam 7 in consideration of a heat balance between the left side and the right side when the irradiation position of laser beam 7 is rotated, weld bead 60 with a uniform penetration depth can be formed, for example.

In the present exemplary embodiments, workpiece 100 (upper plate 8 and lower plate 9) is fixed, and laser beam 7 is moved, by which the object to be welded is irradiated with laser beam 7 along a helical trajectory around a center of rotation which moves in welding direction X. However, laser beam 7 is not necessarily moved. For example, laser beam 7 is fixed, and workpiece 100 is moved, by which the object to be welded is irradiated with laser beam 7 along a helical trajectory around a center of rotation which moves in welding direction X. Alternatively, both workpiece 100 and laser beam 7 may be moved, by which the object to be welded is irradiated with laser beam 7 along a helical trajectory around a center of rotation which moves in welding direction X. That is, workpiece 100 which is an object to be welded and laser beam 7 may move relative to each other, and the positional relation between workpiece 100 which is an object to be welded and laser beam 7 described in the present disclosure may be a relative positional relation.

In addition, welding direction X is not necessarily linear.

INDUSTRIAL APPLICABILITY

According to the laser welding method in the present disclosure, an optical system is mechanically controlled to output laser beam 7 in a helical fashion, whereby width y1 of weld bead 60 can precisely be controlled.

Two or more welding steps are performed, whereby, even if there is gap g, objects to be welded (upper plate 8 and lower plate 9) are bridged. Thus, welding without having hole formation and with a high penetration depth can be performed with excellent reproducibility.

Accordingly, welding failure can be reduced, and a production takt time can be shortened, for example, which are industrially valuable.

REFERENCE MARKS IN THE DRAWINGS

1: laser welding machine
2: controller
3: laser oscillator
4: optical fiber
5: laser irradiation head
6: robot
7: laser beam
8: upper plate
9: lower plate
50, 51: trajectory
60, 61, 601, 602, 603, 611, 612, 613: weld bead
70, 701, 702: centerline
100: workpiece

The invention claimed is:

1. A laser welding method comprising:
a first step for forming a weld bead by irradiating an object to be welded with a laser beam along a first helical trajectory around a first center of rotation moving in a welding direction; and
a second step for irradiating the object to be welded with a laser beam along a second helical trajectory around a second center of rotation moving in the welding direction,
wherein a diameter of rotation of the laser beam in the first step is larger than a diameter of rotation of the laser beam in the second step,
a first weld centerline, as a weld target position, which is a trajectory of the first center of rotation moving in the welding direction in the first step extends along the welding direction,
a second weld centerline, as a weld target position, which is a trajectory of the second center of rotation moving in the welding direction in the second step extends along the welding direction, and
the first weld centerline and the second weld centerline are shifted from each other in one direction in a plan view.

2. The laser welding method according to claim 1, wherein, when a direction of rotation of the laser beam in the first step is a clockwise direction as viewed from the laser beam, the second center of rotation in the second step is shifted from the first center of rotation in the first step to a right side with respect to the welding direction, and when the direction of rotation of the laser beam in the first step is a counterclockwise direction as viewed from the laser beam, the second center of rotation in the second step is shifted to a left side from the first center of rotation in the first step with respect to the welding direction.

3. A laser welding method comprising:
a first step for forming a weld bead by irradiating an object to be welded with a laser beam along a first helical trajectory around a first center of rotation moving in a welding direction; and
a second step for irradiating the object to be welded with a laser beam along a second helical trajectory around a second center of rotation moving in the welding direction,
wherein a diameter of rotation of the laser beam in the first step is larger than a diameter of rotation of the laser beam in the second step,
a direction of rotation of the laser beam in the first step is reverse to a direction of rotation of the laser beam in the second step, and
a welding direction in the first step is same as a welding direction in the second step.

4. A laser welding method comprising:
a first step for forming a weld bead by irradiating an object to be welded with a laser beam along a first helical trajectory around a first center of rotation moving in a welding direction; and
a second step for linearly irradiating the weld bead formed on the object to be welded by the first step with a laser beam along the welding direction, wherein
a first weld centerline, as a weld target position, which is a trajectory of the first center of rotation moving in the welding direction in the first step extends along the welding direction, and
the first weld centerline and a trajectory of the laser beam in the second step are shifted from each other in one direction in a plan view.

5. The laser welding method according to claim 4, wherein, when a direction of rotation of the laser beam in the first step is a clockwise direction as viewed from the laser beam, the trajectory of the laser beam in the second step is shifted to a right side from the first center of rotation with respect to the welding direction, and when the direction of rotation of the laser beam in the first step is a counterclockwise direction as viewed from the laser beam, the trajectory of the laser beam in the second step is shifted to a left side from the first center of rotation with respect to the welding direction.

* * * * *